Aug. 13, 1974  G. ORTEL  3,829,345
PROCESS AND APPARATUS FOR POSITIONING SHEETS
Filed May 3, 1972  10 Sheets-Sheet 2

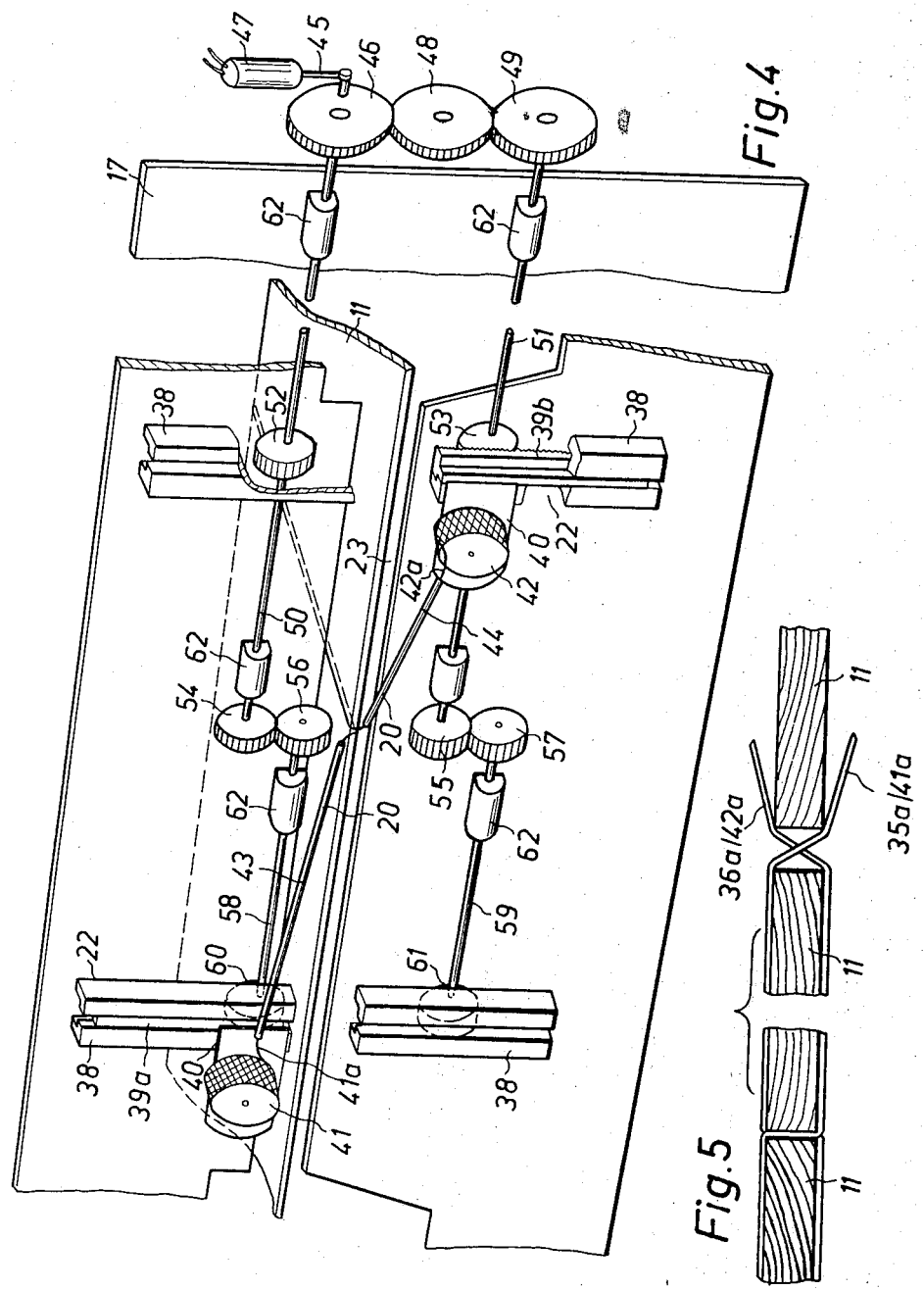

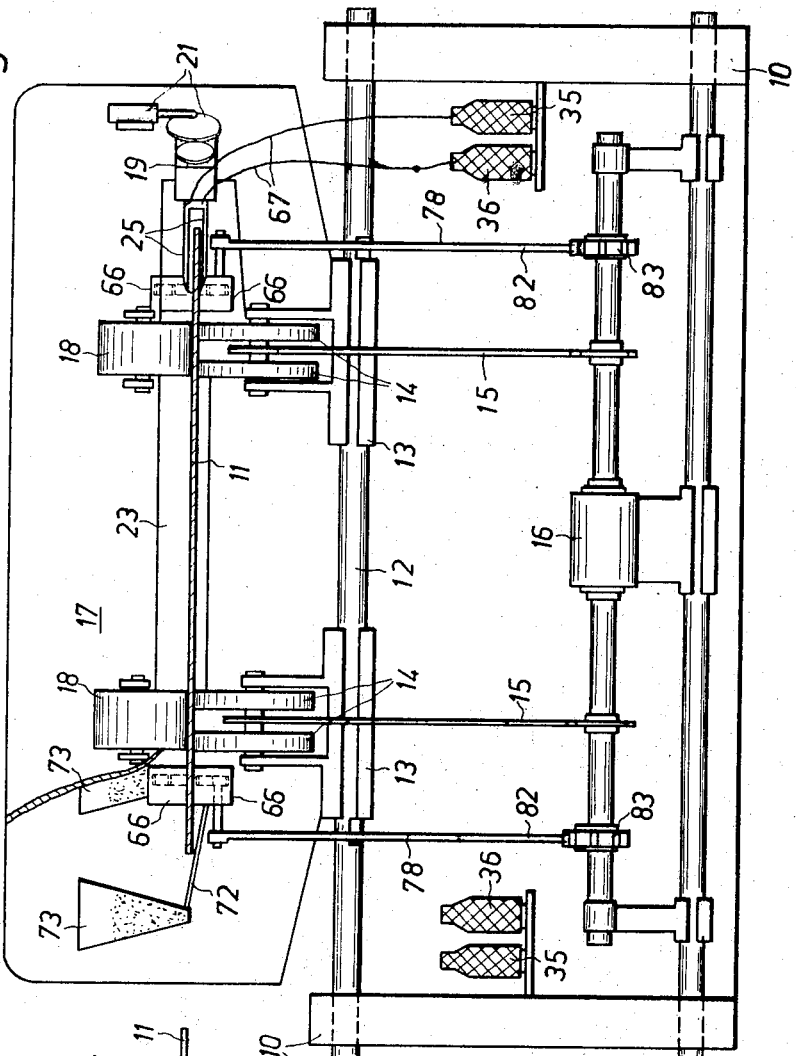
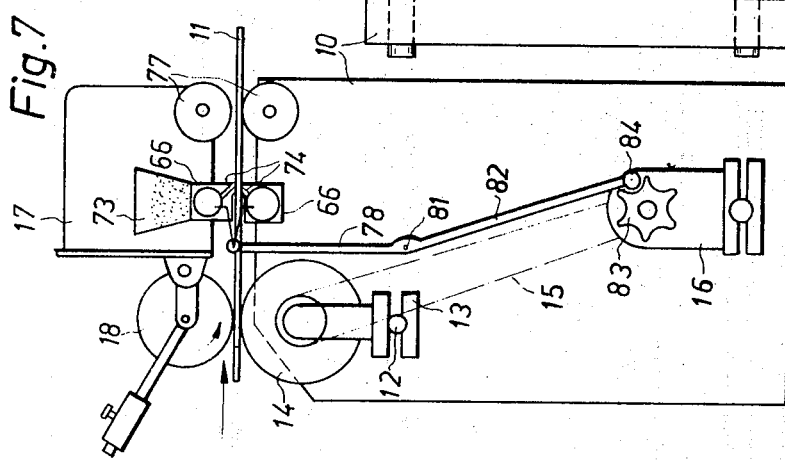

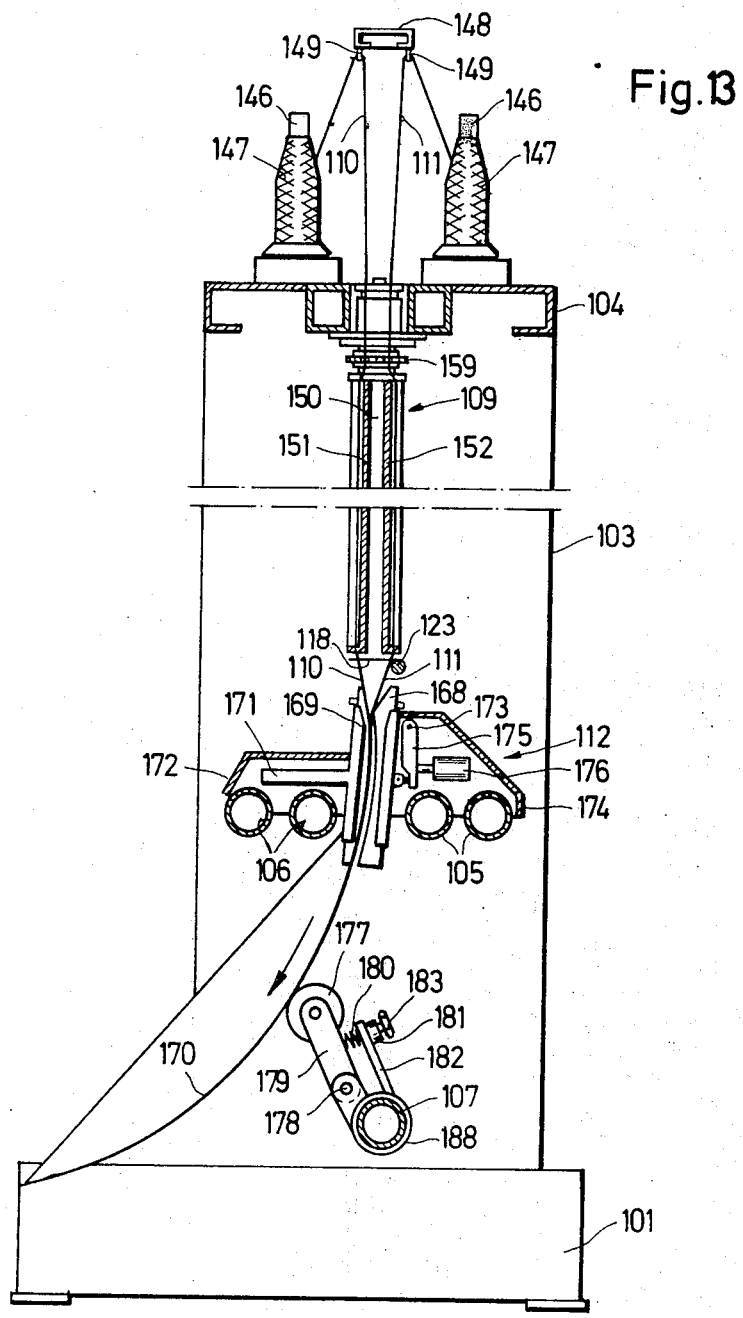

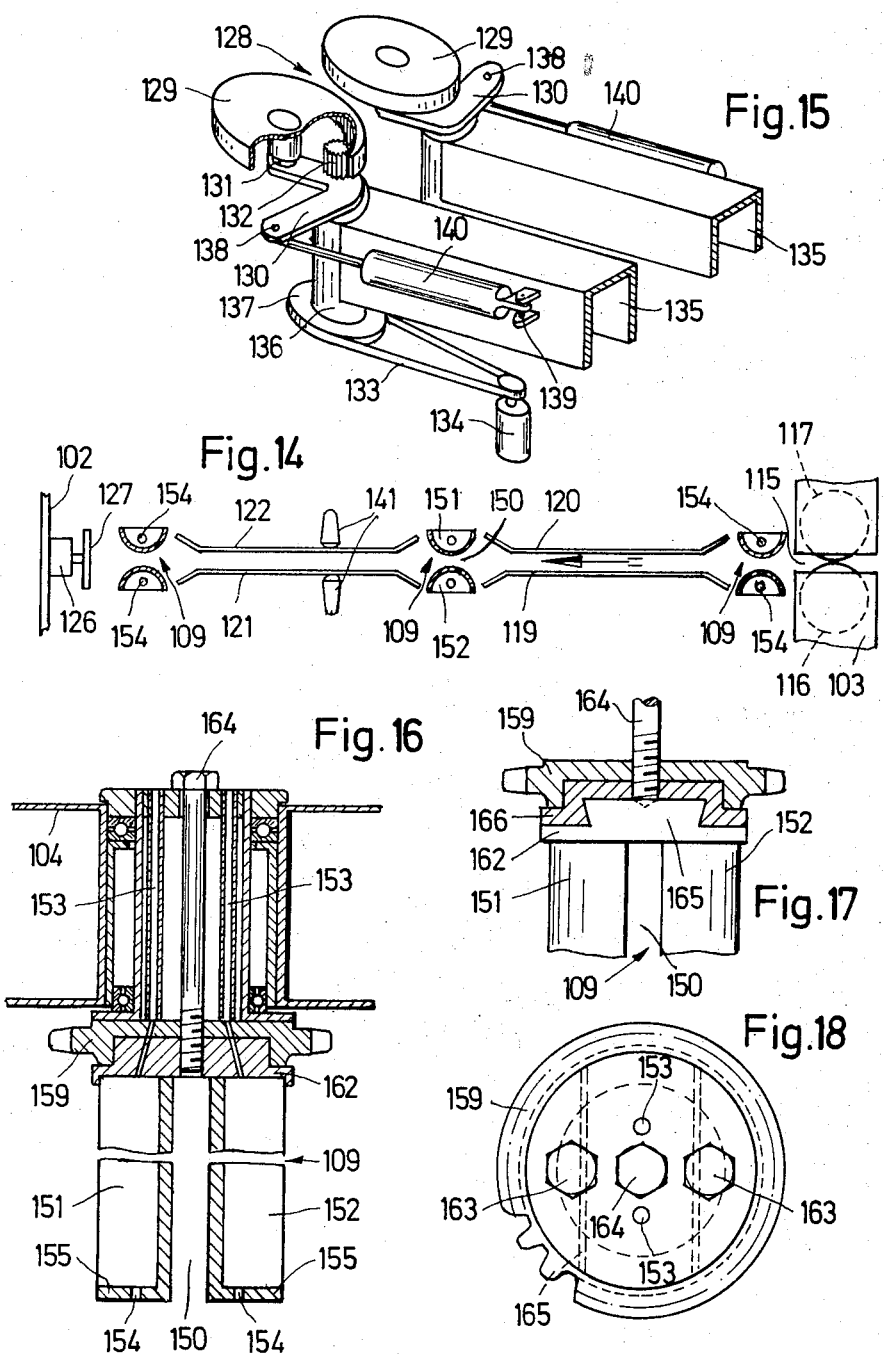

United States Patent Office 3,829,345
Patented Aug. 13, 1974

3,829,345
PROCESS AND APPARATUS FOR
POSITIONING SHEETS
Gerhard Ortel, Rietberg, Westfalen, Germany, assignor
to Heinrich Kuper, Rietberg, Westfalen, Germany
Continuation-in-part of application Ser. No. 800,757, Feb.
18, 1969, now Patent No. 3,686,057. This application
May 3, 1972, Ser. No. 249,893
Claims priority, application Germany, Feb. 21, 1968,
P 16 28 989.7; Austria, Aug. 20, 1968, A 8,104/68
Int. Cl. B32b 5/12
U.S. Cl. 156—393                                17 Claims

ABSTRACT OF THE DISCLOSURE

Apparatus for constructing an extended sheet from strips of material, comprising a supply of the strips, a rotating spider extracting strips one by one from the supply, a ram inserting the strips sequentially and endwise into a part of the apparatus which locates them edgewise together, and a supply of threads one of a pair of which engages alternate (front and back) sides of successive strips under control of a reversing (weaving) mechanism, the threads carrying thermoplastic adhesive, and heaters which press the threads on to the strips and cause them to be adhered in place.

PRIOR APPLICATIONS

German No. P 16 28 987.7 dated Feb. 21, 1968.
Austrian No. A 8,104/68 dated Aug. 20, 1968.
This application is a continuation-in-part application of co-pending application Ser. No. 800,157, filed Feb. 18, 1969, now Pat. No. 3,686,057.

The present invention relates to an apparatus for transversely assembling sheet strips such as veneers, strips of cardboard or the like, in which or with which threads are secured by adhesive to said strips at right angles to their length.

It is an object of the invention to provide a device for assembling strips side by side to form large-surface pieces, the strips being strongly connected together edgewise.

Suitable apparatus is characterised by means guiding two adhesive threads to opposite faces of said strips, means for varying the position of said two threads relative to the plane of movement of said strips, and means alternating this guide means with respect to both upper and lower faces of said strips.

Reference should now be made to the accompanying drawings, in which:

FIG. 4 is a perspective view of a device provided with a movement guiding the thread onto central region of the sheets;

FIG. 5 is a cross-section through adjacent sheets connected at their joints by means of crossing threads;

FIG. 6 is an end view of an alternative embodiment of a device for transversely assembling sheets, having thread guide devices and adhesive application devices arranged above and below in the region of the movement plane of the sheets;

FIG. 7 is a side view of the device of FIG. 6;

FIG. 13 is a vertical section through the same machine near a thread supply and changer, and a cementing device;

FIG. 14 is a cross section in the vicinity of the lateral strip feeding device and thread changer, shown schematically;

FIG. 15 is a perspective view of a braking device for retarding the laterally fed strips;

FIG. 16 is a vertical section through a thread supply and changer;

FIG. 17 is a plan view of the same thread changer and

FIG. 18 is a vertical section through the securing portion of a modified rapidly mountable thread changer.

Figure 1:
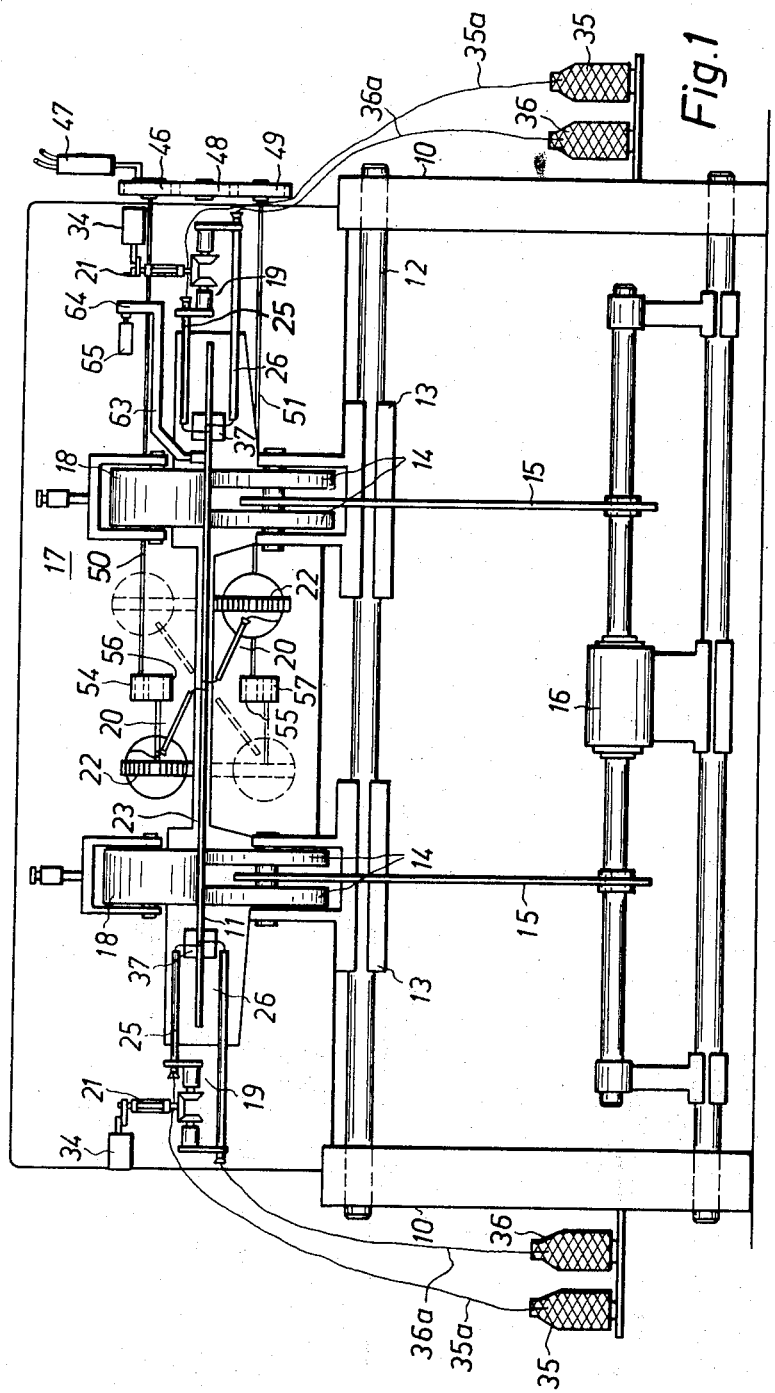
FIG. 1 shows an end view of an apparatus for transversely assembling sheets, provided in the plane of movement of the sheets with thread guiding devices arranged above and below.

An apparatus for transversely assembling strips of sheet in accordance with the invention, such as veneers, strips of cardboard or the like has a machine stand 10 (FIG. 1) in the upper region of which a bearer shaft 12 extending at right angles to the direction of passage of the strips 11 of sheet to be assembled is located. There are two feed rollers 14 displaceably mounted on this shaft by means of brackets 13, the rollers being moved by means of belt drives 15 from a driving motor 16 located in the lower region of the machine stand, the belt drives 15 being displaceable to correspond with the feed rollers 14. Supported on the machine stand 10 is a machine head 17 which has pressure rollers 18 above the feed rollers 14. These rollers, being resiliently mounted, hold the strips of sheet 11 firmly against the feed rollers 14.

For transversely assembling strips of sheet 11 of equal or varying width, guide devices 19 or 20 having movement devices 21 or 22 for moving two threads alternately over or under the strips of sheet 11, are provided in the lateral regions, or in the lateral regions and the central region, of the strips of sheet 11. The gude devices 19, which are arranged in the plane of movement of the strips 11, at the side of the moving strips of sheet 11, are identically formed and lead the thread from each side to the two surfaces of the strips 11.

Figure 3:
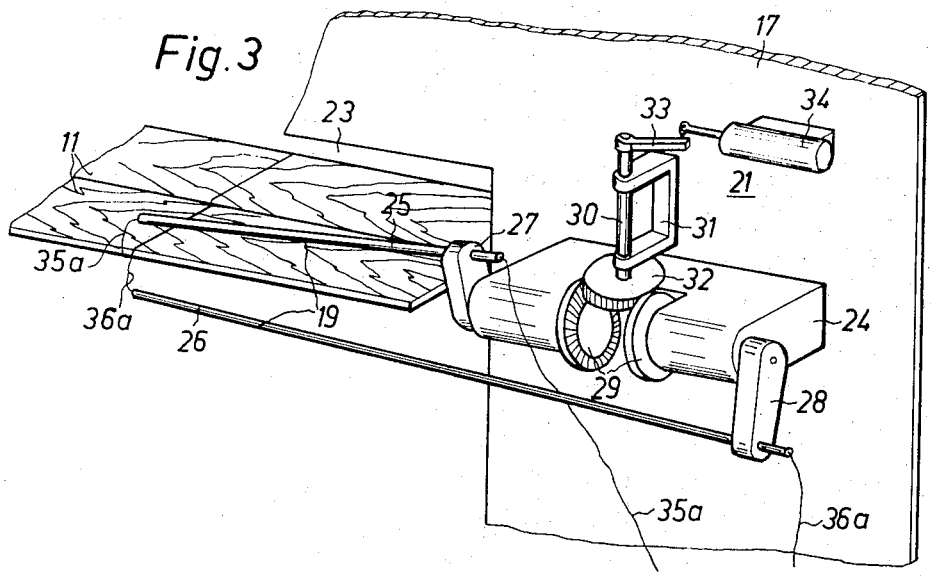
FIG. 3 is a perspective view of a device provided with a movement device guiding the thread onto the lateral region of the sheets.

The machine head 17 has a passage aperture 23 formed therein extending substantially over its width, through which the strips 11 are moved on horizontally; in each of the end regions of the passage aperture 23 there is a support 24 (FIG. 3) for the lateral guide device 21.

The guide device 21 (see especially FIG. 3) is formed by two tubular guides 25, 26 extending in parallel to or at an angle relative to the plane of movement of the strips the guides being displaceably mounted on the support 24 by swivel arms 27, 28.

The tubular guide 25 extends from one end of the support 24 towards the strips, and the tubular guide 26 extends from the opposite end face of the support, the tubular guide 26 being longer than the tubular guide 25.

The swivel levers 27, 28 each engage with an axle through the support 24 and in the recessed central region thereof is a bevel gear 29; the two coaxially arranged bevel gears 29 mesh with a gear 32, the latter being mounted with its axis of rotation 30 at right angles to the other gears in a bearing yoke 31. The axle 30 is connected by way of a lever arm 33 to a thrustor, shown as a pressure actuated cylinder 34. The presure cylinder 34 is arranged on the machine head 17, and the gears 29, 32 and the swivel arms 27, 28 form the drive 21 for the guides 19. The threads 35a, 36a are unwound from the thread rollers 35, 36 and are supplied to the strips 11 to be connected through the two tubular guides 25, 26. The threads 35a, 36a are provided with an adhesive agent, and after being passed over or under a strip, they are firmly connected to the surface so the strip by a heating device 37 (FIG. 1) which is vertically displaceable near the lateral guiding devices 19 and extends above and below the movement plane of the strips 11.

On the machine head 17, above the plane of the strip movement there is an operating device 63 acting in dependence upon the movement of the strips (FIG. 1), the device being formed by a feeler pivotally mounted on a shaft 64 and which for example, the feeler being a cranked lever connected at one end to a switch 65. The switch 65 controls the movement of the tubular thread guides 25, 26, the switch 65 actuating the pressure cylinder 34 in response to the position of the feeler.

Figure 2:
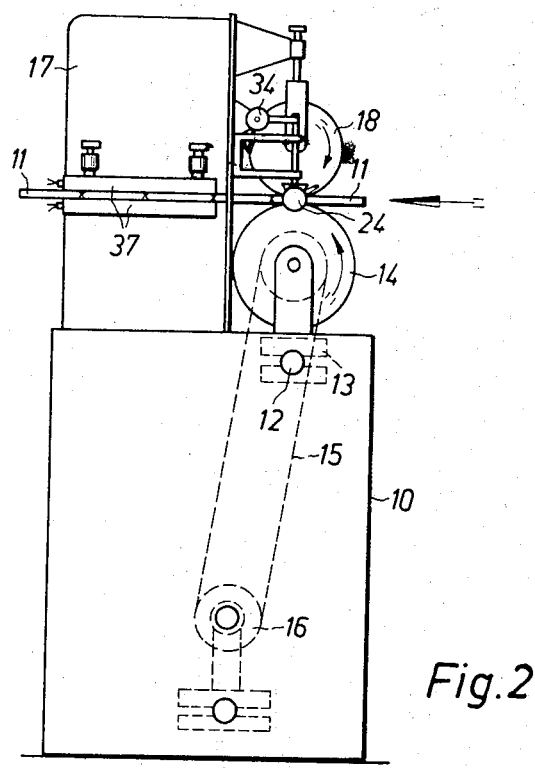
FIG. 2 shows a side view of the same apparatus.

The guides 19 described above, and their associated moving means 21 operate in synchronism, and their mode of operation is as follows:

The strips 11 to be assembled are slipped by hand between the feed rollers 14 and the pressure rollers 18 (FIG. 2). The tubular guide 25 extends above and the tubular guide 26 below the strips 11, and the two threads 35a, 36a are knotted together or otherwise connected so that the leading edge of the strip 11 passing through, engages the threads 35a, 36a. The thread 35a is laid on the upper surface and thread 36a on the lower surface of the strip 11, the two adhesive threads 35a, 36a being guided by means of the tubular guides 25, 26. During the passage of the strips, the feeler 63 slides over the surface of the strips. When the feeler reaches the rear edge of the strip, it tilts on its shaft 64 and actuates the switch 62 which in turn sets the pressure cylinder 34 in motion. This pressure cylinder 34 and its connecting rod carries out a rectilinear displacement movement resulting in rotation of the lever arm 33 through 90° to 120°; this causes the gear wheels 29 to be rotated by the gear wheel 32, the swivel arms 27, 28 connected therewith being similarly rotated, so that the tubular thread guide 25 moves downward below the strip 11 and the tubular guide 26 is moved upwards, so that the guides change their locations. This movement of the guides 25, 26 crosses the two adhesive threads 35a, 36a at the tailing edge of the strip 11. After the changeover of the tubular thread guides 25, 26 has been effected, a subsequent strip 11 is slid against the rear edge of the first strip and this second strip also passes through the device, during which the threads 35a, 36a, pass across its upper and lower faces.

The threads 35a, 36a by alternately overlapping the strips 11, firmly locate them side by side. Subsequently in the heating device 37 a rigid bond is effected by adhesion between threads 35a, 36a and the strips 11. The guide devices 19 and their movement devices 21 may be moved along the machine head 17, so as to provide variation of the thread location over a certain length of the strips. The tubular guides 25, 26 may be displaceably mounted in the swivel arms 27, 28, providing a thread location corresponding to the width of the strips.

In the central region of the strips 11 there is a thread guiding device 20 of different design, with movement device 22 passing through above and below their movement plane (FIG. 4). The movement device 22 has four guides 38 arranged on the machine head 17, two of which are arranged vertically on both side of the central plane normal to the strips 11. The guides 38, arranged in pairs, are juxtaposed with a predetermined spacing; in the guides 38 there is a racked bar 39a, 39b provided so as to be displaceable relative to the vertical guides 38.

In an upper guide pair 38 there is a racked bar 39a and in a diagonally opposite lower guide pair 38 there is a racked bar 39b. On the upper or lower end of these two racked bars 39a, 39b there is a holding plate 40, which is retained outside the guides 38 and is displaceable with the racked bars 39a, 39b.

These holding plates 40 support a thread roller 41, 42 and a tubular guide 43, 44 forming a guide device 20, through which tubular guides, the threads 41a, 42a pass from the thread rollers 41, 42 and are laid on the surfaces of the strips. The two tubular thread guides 43, 44 are pivotally mounted at one end in a hinge point on the associated holding plate 40 and are held by stops, not shown, in position (above and below the plane of movement of the strips) with their ends at the thread outlet side held close to the surface of the strips, so that the tubular guides 43, 44 are each slightly tilted.

The movements of the racked bars 39a, 39b are effected by a pressure cylinder 47 (driving device) engaging a gear wheel 46 by a connecting rod 45, the gear wheel being mounted on the machine head 17. Each tubular thread guide 43, 44 has a gear drive provided as part of the movement device 22 associated therewith, these two gear drives extending above and below the movement plane of the strips and parallel therewith.

The gear wheel 46 drives a second gear wheel 49 via an intermediate gear 48. The gear wheels 46, 49 with their driving shafts 50, 51 are located above and beneath the strip 11, and each has a transmission gear 52, 53 in the region of their guides 38. The free ends of the driving shafts 50, 51 each mesh with a transmission gear 54, 55 by gear wheels 56, 57 on further driving shafts 58, 59; these driving shafts 58, 59 also carry transmission gears 60, 61 in the region of the other guides 38. The driving shafts 50, 51 and 58, 59 are rotatably mounted in bearings 62 secured to the machine head 17.

The transmission gears 52, 53 and 60, 61, rotatably mounted in the region of the guide 38, engage in the racked bars 39a, 39b, which converts their rotary movements into displacement movements of the racked bars 39a, 39b. This up and down movement of the racked bars 39a, 39b causes the tubular guides 43, 44 to periodically reverse their positions, whereby they are alternately above and below the plane of the strips.

The guides 20 and movement devices 22 are arranged in the centre region of the strips; they are displaceable parallel to the plane of the strips of sheet and at right angles to the direction of feed. They operate as follows:

The strips 11 to be joined are pushed by hand between feed rollers 14 and pressure rollers 18, and in their centre region are held together by means of adhesive threads 41a, 42a. The tubular guide 43 is located over and the tubular guide 44 below the plane of the strip, and the two threads 41a, 42a are joined at their ends, so that the strip 11 in passing through engages the threads so that they finally rest on the upper and lower faces of the strips.

The operating device 63 actuates the switch 65 when passing over the rear edge of the strip 11, which switch sets the pressure cylinder 47 in motion. This cylinder 47 imparts to the two driving shafts 50, 51 a rotary movement which is transmitted by means of the transmission gears 54, 55 to the two other driving shafts 58, 59; the transmission gears 52, 53 rotate in an opposite direction to the transmission gears 60, 61. The transmission gear 53 moves the racked bar 39b vertically upwards and the transmission gear 60 moves the racked bar 39a straight downwards.

The two racked bars 39a, 39b are hence moved from an upper into a lower position, or vice versa, by the transmission gears 52 or 61, each being brought into its lowermost or uppermost end position. During the displacement movement of the racked bars 39a, 39b the tubular thread guides 43, 44 carried by them are subject to a positional change. The displacement movement of the tubular guides 43, 44 is in the same direction as their racked bars 39a, 39b; since the tubular guides 43, 44 execute a pivotal movement as well as a displacement movement, the path of displacement of the racked bars 39a, 39b is greater than the path of displacement of the tubular guides 43, 44. These tubular guides are pivoted about their pivots (hinge points) on the holding plates 40 by means of stops, so that the thread outlet ends of the tubular guides 43, 44 also are located close to the strip 11, with the guides 43, 44 oppositely inclined.

This alternation of the tubular guides 43, 44 occurring at the rear edge region in the direction of passage has caused the threads 41a, 42a to cross (FIG. 5). In the subsequent strip 11 the threads 41a, 42a are supported in reverse arrangement on the faces of the strips. As each strip of sheet 11 passes through, reversal of the tubular guides 43, 44 occurs at the rear edge, so that the strips 11 are held together by the threads 41a, 42a. A heating device (not shown in the figure) attaches the adhesive threads 41a, 42a firmly to the strips, since this heating device heats the adhesive provided on the threads 41a, 42a and rolls or presses it against the strips.

The two thread guiding devices 19 and 20 may be of other forms, with the associated movement devices 21 and 22 mutually or separately moved in accordance with the width of the strips, with a plurality of guide devices 20 in juxtaposition on the apparatus.

In a further embodiment of a device for transversely assembling strips as 11 shown in FIGS. 6 to 9 of the drawings and which in basic structure corresponds to the device shown in FIGS. 1 to 5, each thread guide device 19 or 20 has associated therewith, above and below the plane of movement of the strips, an adhesive application device 6 which is displaceable along the length of the strips. The devices 66 are used to apply spots of adhesive at spaced intervals along the threads.

Figure 8:
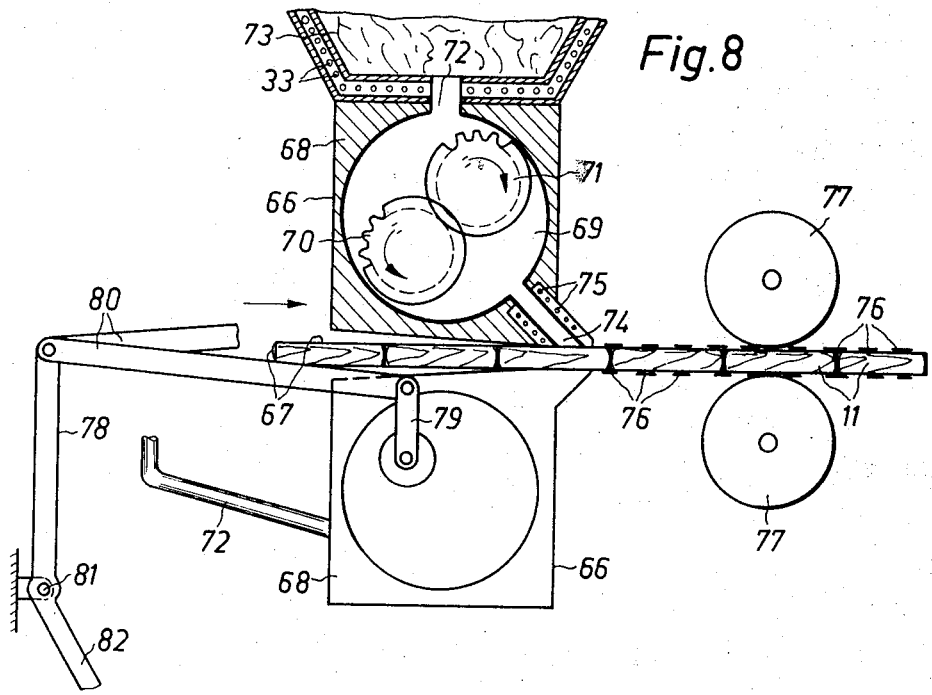
FIG. 8 is a side view partly in section of the adhesive application devices arranged above and below the sheets.
Figure 9:
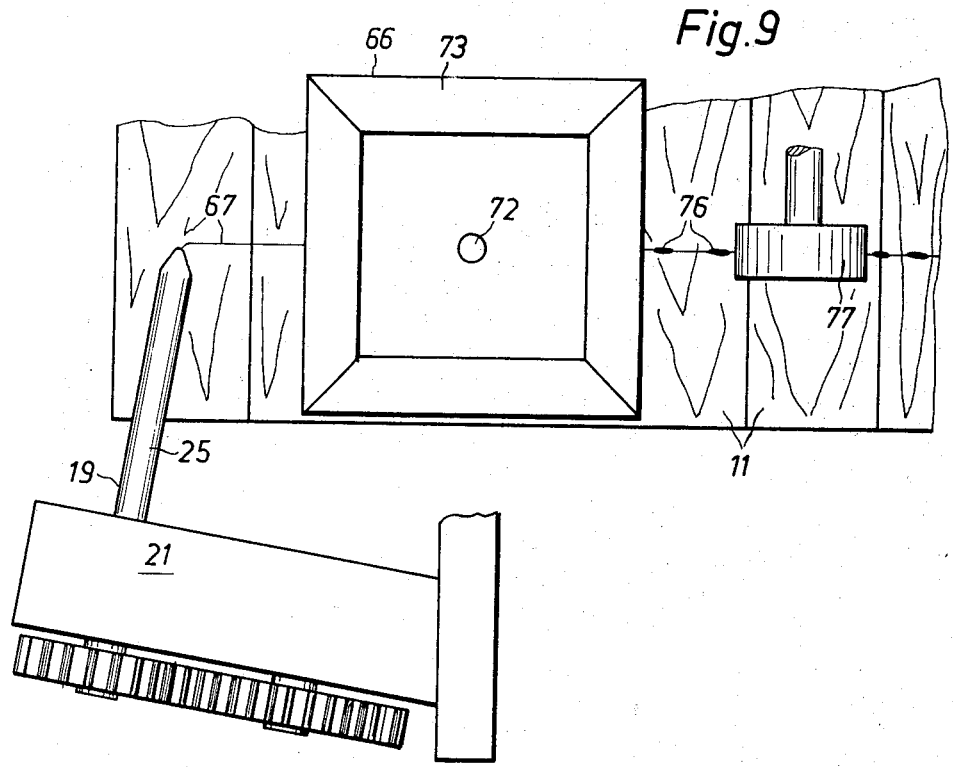
FIG. 9 shows a plan view of the adhesive application device and thread guide device of FIG. 8.

The adhesive application devices 66 are preferably identical in structure and symmetrically oppositely arranged. As best seen in FIG. 8, each adhesive application device 66 is provided with a gear pump 68 in a cylindrical pump chamber 69, with two gear wheels 70, 71 meshing with one another; they are also in sliding contact with the wall surface of the pump chamber. The cylindrical pump chamber 69 of each gear pump 68 communicates by means of a feed passage 72 with an adhesive reservoir 73. From the pump chamber 69 an adhesive passage 74 supplies the adhesive to the surfaces of the strips, the passage extending inclined relative to the plane of the strips, the supply passage 72 being arranged on one side and the adhesive application passage 74 on the other side of the two gear wheels 70, 71.

The adhesive reservoir 73 and the adhesive application passage 74 may each be fitted with a heating device 75, so that a thermoplastic granular adhesive (polyester, polyamide) becomes liquified and is applied in the form of thick liquid spots 76 on the surfaces of the strips. Above and below the movement plane of the strips there are pressing rollers 77 pressing the adhesive and the thread 67 against the surfaces of the strips.

As seen in FIG. 7, the two adhesive application devices 66 (arranged above and below the strips) are driven in synchronism by the driving device 16, the two gear pumps 68 being controlled by means of a lever linkage 78 to the driving device 16 and are synchronised therewith.

One gear wheel 70 of the adhesive application device 66 is connected by means of a linkage 79, 80 and a lever 78 to a pivot point 81; it is thereafter connected with the driving device 16 by a lever 82 fixedly attached to the lever 78 at the pivot point 81, the lever 82 being positively connected to the driving device 16; both adhesive application devices 66 have a cam gear 83 adapted to cause the pivot lever 82 to execute reciprocating pivotal movements, the cam being in the form of a star wheel against which the pivot lever 82 is retained under tension with a roller 84.

The end of the pivot lever 78 away from the control gear 83 is connected with the gear wheels 70 by means of the linkages 79, 80. Between the links 79 and the gear wheels 70 there are one way clutches whereby the gear wheels 70 are displaced by a forward movement of links 80 towards the pressing rollers 77, but remains stationary during the opposite displacement movement.

The apparatus described above by way of FIGS. 6 to 9 operates as follows:

The strips 11 to be assembled at right angles to their longitudinal extension, are slid by hand between the transport rollers 14 and the pressure rollers 18 and pass through the apparatus in the direction of the arrow (FIGS. 7 and 8). The thread guiding devices 19 or 20 supply a thread 67 on both sides to the strips causing the thread to be laid alternately on the upper and lower faces of the strips.

After supplying the thread, an adhesive is applied in spots on the sheet surfaces and subsequently pressed together with the threads 67 against the sheet faces.

The driving device 16 with its control gear 83 causes the lever 82 to carry out a pivotal movement about bearing 81, which movement is transmitted to the two levers 80 connected thereto. These levers 80 in turn cause the links 79 connected thereto to execute pivotal reciprocating movements which are transmitted by the one way clutches to the meshing gear wheels 70, 71 as a rotary movement. The gear wheels 70, 71 of the gear pumps 68 are moved through a certain rotary angle at equal time intervals, the adhesive entering the pump chamber 69 from the reservoir 73 being forced between the gear wheels 70, 71 and the adjacent pump chamber wall surfaces from the pump chamber section formed by the gear wheels 70, 71 into the other pump chamber section communicating with the adhesive application passage 74. This pump chamber and the adhesive application passage 74 are constantly filled with adhesive and the latter is supplied by a rotary movement of the gear wheels 70, 71 forcing a proportion of adhesive out of the adhesive passage 74 and onto the surface of the strips where it is discharged as spots 76. The viscosity of the adhesive and its surface tension prevent accidental leakage of adhesive.

The spots 76 of adhesive applied in successive intervals in the region of the threads 19 placed on the surfaces of the strips, are pressed by the pressing rollers 77 against the faces of the strips, so as to produce a rigid bond between threads 67 and strips 11 so that the strips are joined side by side.

The device of the present invention shown in FIGS. 10-18 for the assembly of individual strips, more particularly veneer strips, for forming comparatively large sheets, comprises a machine base 101, the side portions 102, 103 of which are connected together by an upper cross piece 14 and cross bars 105, 106, 107.

In this assembling device the individual strips 108 are introduced individually on one side of the device and then connected together on edge and standing one above the other; they are first moved past a plurality of stations in lateral spaced relationship provided with an adhesive coated connection thread 110, 111 by means of thread feeders and thread changing (weaving) devices pivotable for changing over the threads. These threads 110, 111 are cemented in cementing devices 112 to the veneer strips 108 and a veneered sheet 113 is produced which is then removed at intervals by removing devices 114 and fed to a separating device (not shown) for removing the veneered sheet (see FIG. 10).

In the area between the cross bars 105, 106 and the cross head 104, one side portion 103 of the machine stand 101 has a lateral insertion gap 115 for laterally feeding veneered strips 108. As may be seen in FIG. 11, on both sides of this edge-wise insertion gap, there is an upright rotating conveyor roller 116, 117. These conveyor rollers 116, 117 are driven in opposite directions by a gear wheel drive, chain drive, belt drive or the like (not shown) and may be made adjustable in their relative spacing by a displaceable bearing arrangement or provided with a resilient surface.

A lower abutment 118 located below the plane of the insertion gap is provided between the two side portions 102, 103 for receiving a laterally moved veneer strip 108, said lower abutment together with guide walls 119, 120, 121, 122 being detachably secured to the cross head 104, and arranged upright above it to form a guide path for the veneer strip 108 during application of the connecting threads 110, 111. In order that a laterally introduced veneer strip can be conveyed further downwardly, the lower abutment 118 may be moved out of its supporting position. For this movement it may be pivoted, or it may be displaceable linearly. A shaft 123 extending between the side portions 102, 103 is provided for forming the lower abutment 118, said shaft 123 being provided with a plurality of place members arranged tangentially thereon and acting like a hinged flap. For the pivoting of the lower abutment 118, the shaft 123 is connected by a level 124 (see FIG. 10) to a hydraulic cylinder 125 secured to the side portion 102 or to a cross bar 105 or 106.

The guide walls 119, 120 and 121, 122 are provided in pairs and each arranged between two upright thread feeding and thread changing devices of inverted U-form.

The number of thread feeding and thread changing devices 109 used depends on the length of the veneer strips 108 to be connected together—an embodiment is shown having three thread feeding and thread changing devices 109, but only two may be provided.

The lateral guide walls are detachably secured to the cross head 104 by means of plug members, such as pins, butt straps or by means of retaining plates or retaining angles and screws and are bent or angled at their ends opposed to the laterally moved veneer strip 108. Each guide wall 119, 120, 121, 122 may be constructed in one piece or as an assembly. It may have a grid-like form.

At the end of the guide path formed by the parts 118–122 there is a limit switch 126, actuation of which causes pivoting of the lower abutment 118, the change of the thread, and the downward removal of the threaded covered veneer strip 108. In order to obtain accurate switching, a bar switch strip 127 pivoting about a horizontal axis is provided (see FIGS. 10, 11 and 14). To ensure that the veneer strip when moved laterally into the assembling device of the present invention by the conveyor 116, 117 cannot strike too violently against the bar switch 127, a braking device 128 is introduced into the lateral path of the veneer strip.

This braking device is formed of two brake rollers 129 arranged one on each side of the path for the veneer strip. At least one of these two rollers is mounted on a lever which pivots about an upright axis by means of a hydraulic cylinder for the retarding operation so that the opening between the two brake rollers 129 is reduced.

A preferred braking device is shown in FIG. 15. In this case the brake rollers 129 are mounted to rotate on an upright axle 131 provided on a bell crank lever 130 and fitted with a friction surface co-operating with a driving pinion 132. Each brake roller 129 is provided with inner teeth meshing with the driving pinion 132. The driving pinion 132 is connected with the interposition of a contact drive 133 or gear wheel drive to a driving motor 134. The bell crank lever 130 carrying the brake roller 129 is supported by an arm 135 secured to the machine base 103. The bell crank lever 130 is mounted at its angle part on a shaft (not shown) mounted in the arm 135 or a bearing sleeve 136 provided thereon, and connected to the driving pinion 132 and a transmission member 137 of the contact drive 133. Whilst one arm of the bell crank lever 130 supports the brake roller 129 by means of an axle 131, the other arm of the bell crank lever is connected by way of a link point 138 formed by a pin to a hydraulic cylinder 140 displaceably mounted at the link point 139 on the arm 135 or the side portion 103 of the machine base. If the piston rod of the hydraulic cylinder 140 is extended out of the cylinder housing, the bell crank lever 130 is swivelled and the brake roller 129 is moved in the direction of the path of movement of the veneer strip. Although it is also preferable in the case of the construction shown in FIG. 11 to move both brake rollers against a veneer strip 108 to be retarded, it is possible to provide only one of the two brake rollers 129 to be displaceable.

The drive motor 134 is secured to the bearing arm 135 or the side portion 103 of the machine base and in either case provided only for one roller, or for both brake rollers 129 if driving means are interposed between the driving member 132 and the driving motor 134.

In the embodiment shown, a strip 108 moved laterally into the assembling device is retarded at its rear end. The retarding movement is controlled by a photocell device 141 as soon as the front end of the sheet intersects the path of the beam of the photocell device 141. The photocell 141 is associated with the guide walls 121, 122 which have an opening 142 in this area. In order to achieve accurate timing in the control of the braking operation with strips 108 of various lengths, the photocell device 141 is displaceable on the guide walls 121, by supporting clips 143 the opening 142 being formed as a slot. The photocell device engages a guide slot of the supporting plate 143 and is adjustable in position by means of screws, or the like. The photocell device 141 includes a transmitting member mounted on the guide walls 121, 122 and a receiver mounted on the other guide wall 122 or 121; alternatively both may be mounted in the same housing and a mirror used.

It is preferred to provide the braking device 128 in the region of the switch strip 127 so that the strip 108 is engaged at its front end for braking its speed.

The thread guiding devices 109 (see FIG. 10) represent feeding and changing devices for the connecting threads 110, 111 which are drawn from spools 147 provided on mandrels 146 arranged on the cross head 104. Each thread 110, 111 is first raised from the spools 147 to a guide member 149 arranged above the cross head 104 on the machine stand 101 and then lowered through the thread feeding and thread changing device 109 to the veneer panel 108 (see FIG. 10 and 12, 13). Each thread guiding and changing device 109 has two guide members 151, 152 located fork-like in spaced adjacent relationship, forming a guiding gap 150 open at the bottom, said guide members being connected together at the upper end and reciprocating through a certain angle about a vertical bearing axis.

The guide members 151, 152 may be formed by tubes; the embodiment shown is preferred, in which thread guides 153, 154 (see FIGS. 14 and 16) are provided at the ends of a C or V-shaped channeled length so that each connecting thread 110, 111 is guided only in two positions in the passage of the thread. The thread guides 154 are either annular members, hooks at the lower ends of the guide members 151, 152, or (as shown in FIG. 16) an aperture in a base wall 155. In order to provide only a slight friction during the passage of the thread, it may be preferable to provide the thread guides 153, 154 on their guiding surfaces with a friction reducing coating or to make the thread guides 153, 154 of a material having a low friction co-efficient.

The thread guiding and thread changing devices 109 constructed of inverted U-shape are mounted suspended from the cross head 104 by the upper ends of their bearing axes with the interposition of slide bearings (not shown) or roller bearings 156, 157, and are provided above their guide members 151, 152 with a chain wheel 159, driven by a contact drive 158.

In the embodiment shown in FIG. 16, the two guide members 151, 152 are arranged on a bifurcated head 162 carrying on its upper extension the chain wheel 159 which is rigidly connected to the guide members 151, 152. This connection may be achieved by means of a spring or by means of screws. The chain wheel is connected to the bearing of the thread feeding device by means of screws 163 and to the bifurcated head 162 by means of a screw 164 (see FIGS. 16 and 18). The thread guiding eyelets 153 are formed by separate guide passages (more particularly guide rollers) or the screws 163 are provided with a continuous longitudinal bore for forming the thread guiding eyelets 153. In order when necessary to enable easy removal of a thread feeding and thread guiding device 109 the bifurcated head 162, as shown in FIG. 17, is provided with a dove-tailed extension 165 which engages in a dove-tail recess 165 of an intermediate member 166 supporting the chain wheel 159 and connected to the bearing axle. The centre screw 164 of the embodiment according to FIG. 16 assumes in this case a centering function and can therefore be provided with a centering point or centering tip which presses the dove-tail extension 165 of the bifurcated head 162 against the dove-tailed surface of the intermediate member 166. Instead of a dove-tail connection between the bifurcated head 162 and intermediate member 166, any kind of rapidly detachable connection (for example a bayonet connection) may be used.

In order to obtain sufficient accommodation space for a hydraulic cylinder 161 used to drive the contact drives 158 in the case of a small diameter of the chain wheel 159, the contact drive 158 is first guided by its parts at the ends of the piston rods around guide wheels 167 mounted on the cross head 104 and only then loops around the chain wheel 159 of the two outer (lateral) thread guiding and thread changing devices 109. It is preferable to pass the chain alternately around the chain wheels (see FIG. 11), so that, during the movement of the chain, a part of the thread feeding and thread changing devices 109 executes a right hand pivotal movement and one part thereof a left hand pivotal movement. The to-and-fro displaceable thread feeding and thread changing devices 109 pivot only for changing the thread above a veneer strip 108 introduced into the assembling device and are aligned until they are pivoted again and thus with a thread change—in such manner that the two guiding members 151, 152 thereof are disposed on both sides (particularly at the front and back) of the feeding plane of the strip and the gap 150 existing between the guide members 151, 152 and open at the bottom, permits lateral feeding of the strip into the assembling device and removal downwardly (see FIG. 11).

The bifurcated thread feeding and changing devices 109 thus simultaneously form a limitation and guide for the feed of the veneer strips and extend only in the upper portion of the apparatus, whilst the cementing devices 112 and, in the lower area, the device for removing the veneer panels (workpiece removing device 114) are provided approximately in the area half way up the apparatus.

In the region of each thread feeding and changing device 109 there is a cementing device 112 shown in FIG. 13 below the path of movement of the abutment (flap) 118 supporting the veneer strip 108 laterally introduced into the apparatus. The cementing device comprises two electrically heatable pressure shoes 168, 169 spaced from each other on both sides of the plane of movement of the veneer strip. The pressure shoes 168, 169 match each other in the shape of their operating surfaces. As shown, they have arcuate surfaces which are adapted to the arcuate surface of a guide wall 170 removing the assembled workpiece 113.

When operating, both pressure shoes 168, 169 or only one of the two pressure shoes 168, 169 may be arranged to move in the direction of the veneer strips 108. The pressure shoe 169 is securable and displaceable in the direction of the workpiece by a guide member (guide rib) 171 on a bearing housing 172 displaceable and securable in known manner on the cross bar 106. The guide member 171 engages in a slot of the bearing housing 172 or is provided with a guide groove on a guide rib on the bearing housing 172 and secured in position by means of a clamping screw or lock member.

The pressure shoe 168 is moved towards the veneer strip 108 located between the pressure shoes 168, 169 for the cementing operation. For this purpose the pressure shoe 168 is pivotably connected to a lever 175 mounted at the pivotal point 173 on a bearing housing 174 which is mounted to be laterally displaceable and fixed in position on the cross bars 105. A hydraulic cylinder 176 acts on lever 175, and is secured to the bearing housing 174.

The bearing housings 172, 174 are supported on the cross bars 106, 105 and are secured in position by means of yokes (not shown) engaging below the cross bars.

A pressure member 177 is provided below each device 112 for additionally pressing against the cemented threads 110, 111. This pressure member 177 is formed by a roller mounted to rotate on a lever 179 journalled displaceably at the joint 178, said lever being urged in the direction of the veneered sheet 113 by means of a spring, more particularly a compression spring 180.

The spring 180 is provided between the lever 179 and an arm 182 fitted with a recess 181 (particularly a spring cup-pot). For setting the force of the spring, a set screw 183 may be provided in the recess 181. The arm 182 and the bearing point for the lever 179 are provided on a bearing member 188 laterally displaceable and securable on the cross bar 107. This bearing member 188 may be formed by an annular bearing housing or a clip.

Figure 10:
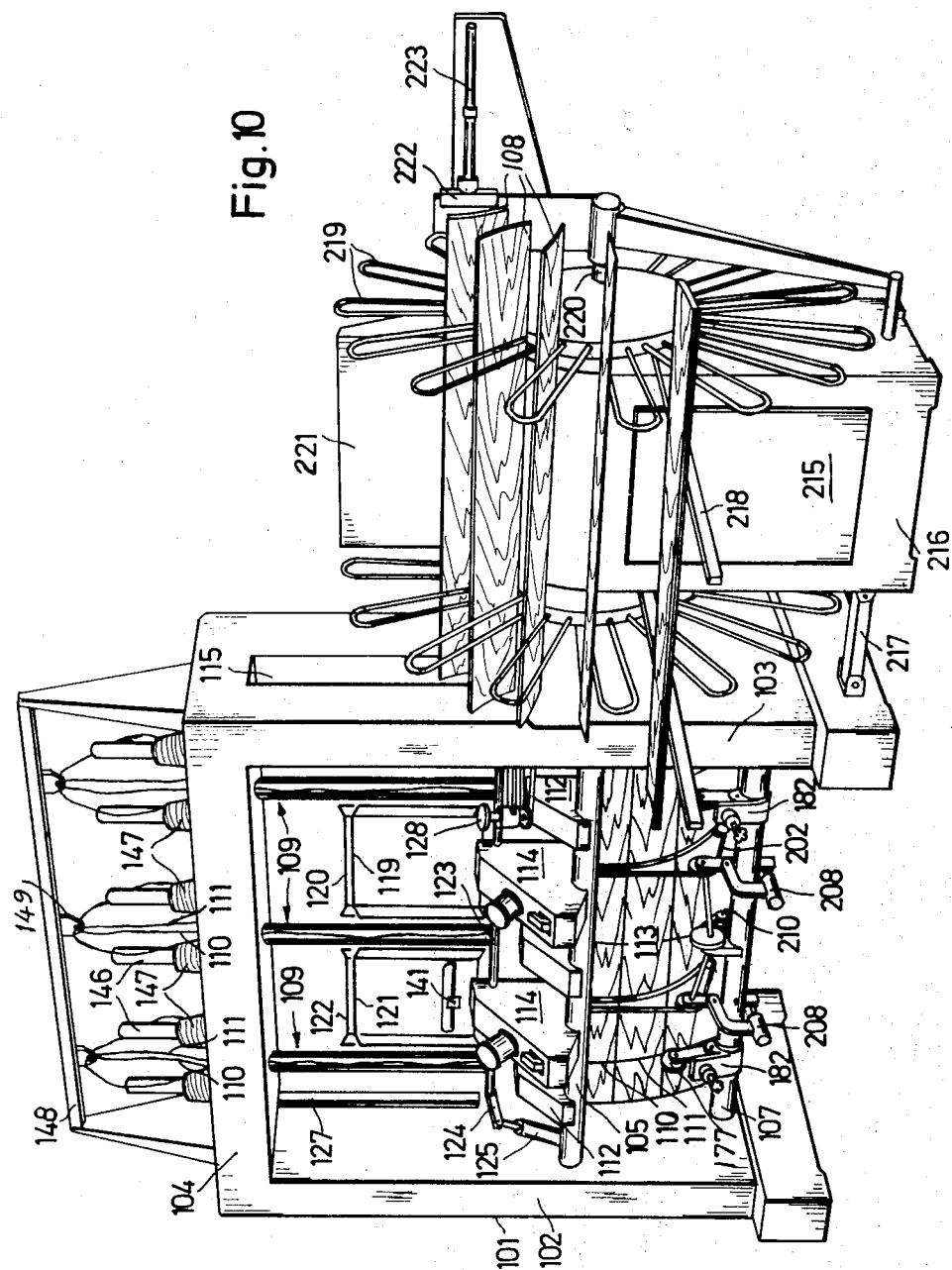
FIG. 10 is a perspective view of a modified machine for the transverse assembling of strips, such as veneers, wherein the individual strips are introduced on edge laterally between suspended thread suppliers and are connected together standing one upon the other.
Figure 11:
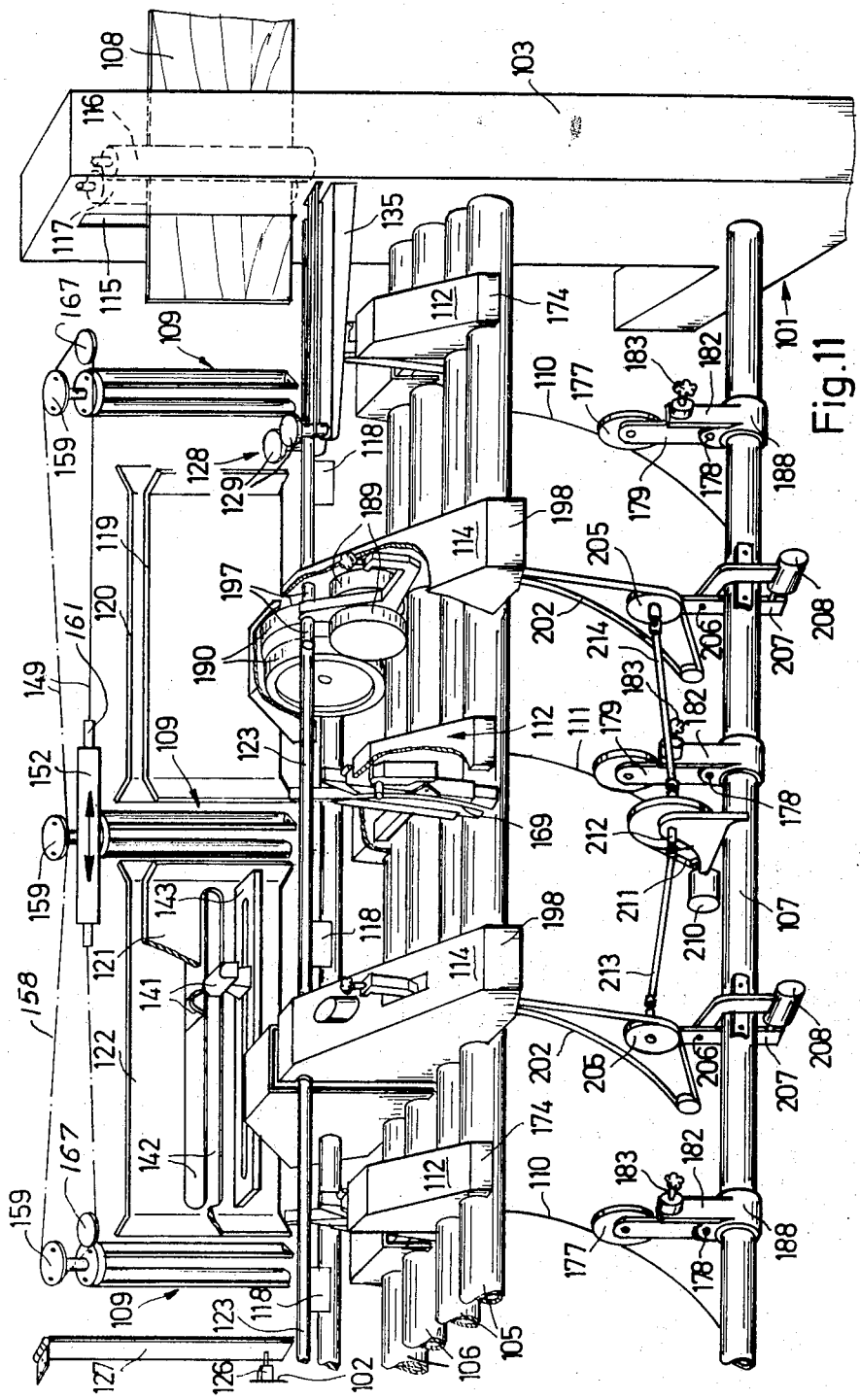
FIG. 11 is a perspective view of part of the machine of FIG. 10.
Figure 12:
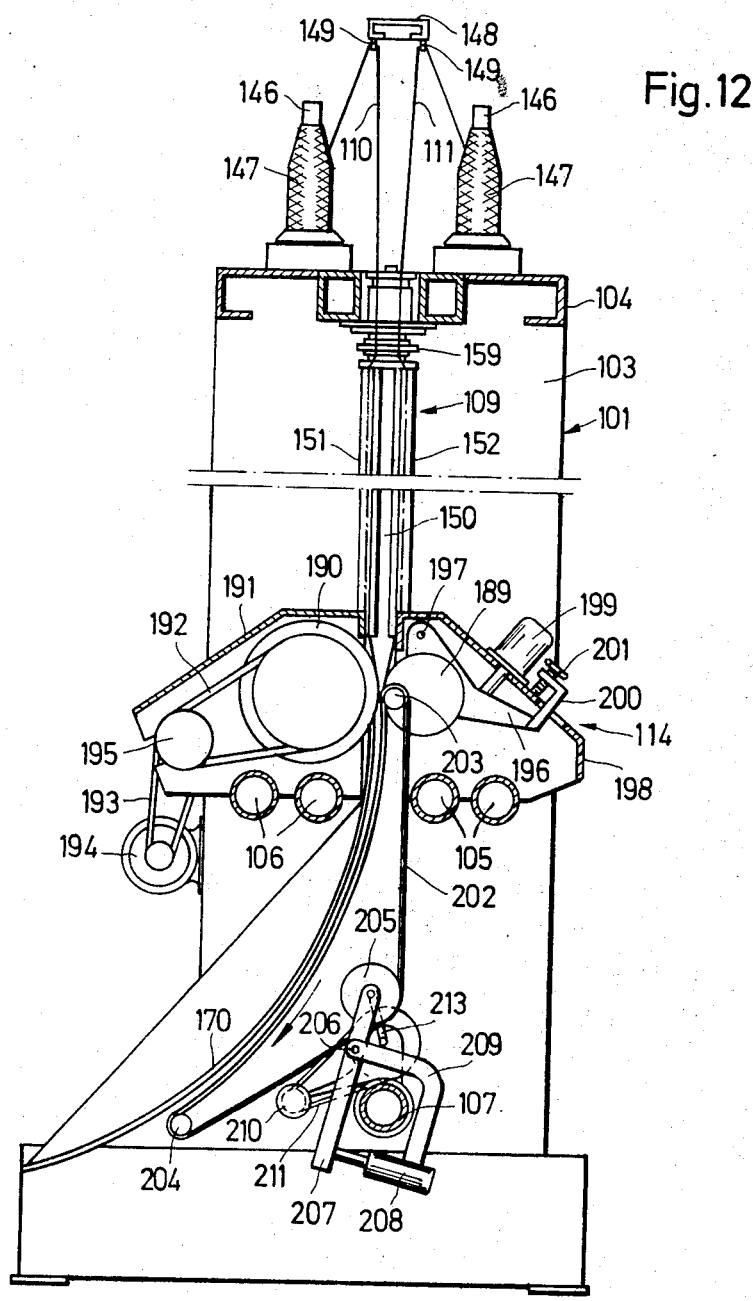
FIG. 12 is a vertical section through the same machine in the region of a thread supply and changer, and a conveyor device for feeding the interconnected strips.

Between the cementing devices 112 are the removing devices 114 (see FIGS. 10–12). Each removing device 114 is provided above a guide wall 170 with two oppositely disposed conveyor rollers 189, 190 each of which may be designed as a single roller or, as shown in FIG. 11, as a double or twin roller.

The conveyor roller 190 is mounted in a bearing housing 191 provided on the cross bars 106 and driven by contact drives 192, 193 from the motor 194. The motor 194 may be provided for all these conveyor rollers 190 of all the removing devices 114 or only for the conveyor roller 190 of a single removing device 114. In the construction according to FIG. 12, the power of the motor 194 secured to the machine base 101 is transmitted by way of the drive 193 to a transmission member (double belt disc or double chain wheel) 195 and by way of the drive 192 to the conveyor roller 190.

The conveyor roller 189 freewheels on a level 196 which in turn is mounted at the joint 197 on a bearing housing 198 on the cross bars 105 and is driven in the operative position (in the direction of the part to be conveyed) by means of a hydraulic cylinder 199 on the bearing housing 198. In order to set the preventing movement of the conveyor roller 189, the lever 196 is provided with an angle 200 at its end remote from the pivotal point 197, said angle extending through an opening in the housing and carrying a set screw 201 which is supported at its free end on the bearing housing 198 in the operative position of the pressure roller 189—by adjusting (turning, screwing in or out) the set screw 201, the space between the conveyor rollers 189, 190 can be simply set to the thickness of the workpiece.

The bearing housings 191, 198 are laterally displaceable and securable on their cross bars 106, 105 in the same manner as the above described bearing housings 173, 174 of the cementing devices 112.

To enable the workpiece 113 asembled from individual strips (veneer) strips 108 to be removed without damage, conveyor belts or chains 202 are provided in the region of the curved guide walls 170 forming an abutment for the workpiece 113.

These conveyor belts or chains 202 are provided with a rubber or plastic operating surface and are guided with a small clearance from the guide wall 170 on freewheeling guide members 203, 204 formed by rollers or chain wheels, as and on an interposed driven guide member (belt pulley, chain wheel) acting as clamping member. The guide members 203 are secured on the bearing housings 198, and the mounting of the guide members (204) is on the cross bars 107 or on side members 102, 103 of the machine base.

Guide members 205 simultaneously exerting a clamping function are mounted on a double armed lever 207 which is journalled to be displaceable at the joint 206 and on which a hydraulic cylinder 208 acts. The mounting of the lever 207 and the securing of the hydraulic cylinder 208 are preferably effected by means of a common part, preferably a bell crank lever 209 mounted on the cross bar 107.

For the drive of the guide members 205, the cross bar 107 is provided with a motor 210 by which, by way of a drive (chain drive, belt drive) 211, a driving shaft 212 is driven, by which the guide member 205 is driven by way of a cardan shaft 213, 214.

For laterally introducing the strip 108 into the apparatus of the present invention, a feeding device 215 is provided adjacent to the side 103 of the machine base, the frame 216 of the feeding device 215 being connected to the machine stand 101 by way of connecting members 217.

The feeding device 215 is provided behind a support carrying a stack of veneer strips and formed of two supporting struts (bars or beams) 218, a conveyor spider 219 which is composed of two spiders arranged adjacently to each other with a space between them and rigidly connected together which are rotated by a driving device (not shown) around its bearing axis 220. A veneer strip 108 taken from the stack by an operator and placed on the arms of the spider 219 is raised by means of the spider to the plane of the insertion gap 115 of the machine base against a rear abutment 221 and brought out of a horizontal or approximately horizontal position into a vertical (edge-wise) position. To ensure that the veneer spider 219 does not drive a strip (veneer strip) inserted therein too far, an end limit switch is provided on the plane of the abutment 221 formed by a vertical wall, and when the switch is operated, the rotary movement of the conveyor star is switched off, or the drive thereof may be operated so that the spider 219 turns only through a certain angle.

At the side of the feeding device 215 remote from the part 103 of the machine base, an insertion member 222 is provided on the plane of the insertion gap 115 and is laterally reciprocated by a hydraulic cylinder 223; it strikes during the forward stroke against the front edge of a veneer strip 108 moved against the abutment 221 and inserts the strip 108 into the insertion gap 115, where it is engaged by the continuously rotating conveyor rollers (draw-in rollers) 116, 117 and moved further in a transverse direction. The above-described apparatus operates as follows:

A panel strip 108 lying flat is inserted by the supporting rods 218 into the conveyor spider 219 of the feeding device 215, pivoted by the spider into a position on edge and raised to the plane of the insertion gap 115 where it is laterally displaced by means of the insertion member 222 and is moved still standing on edge into the assembling device by the conveyor rollers (draw-in rollers) 116, 117. The veneer panel 108 is disposed on the abutment 118 and kept in the upright position by means of the guide walls 119–122 and the thread feeding and changing devices 109. As soon as the front edge of the veneer strip crosses the path of a beam of the photocell device 141, the retarding movement of the braking device 128 is operated and the strip 108 reaches the bar switches 127 at reduced speed by the actuation of which the switch mechanism 126 is actuated and the following operations ensue;

(a) lowering of the already assembled panel 113 and of the top strip 108 still disconnected from the connecting threads 110, 108,
(b) pivoting of the thread changing devices 109 about the upright bearing and pivoting axis thus effecting a thread change above the upper longitudinal edge of the veneer strip,
(c) starting of the next working stroke (raising and insertion of the next veneer strip 108).

The applied thread is cemented during the removal of the next veneer strip by the cementing devices 112. The thread feeding and changing devices 109 execute a left-hand pivotal movement in one operation and a right-hand pivotal movement in the next operation.

Since the individual strips 108 are always moved laterally as far as the bar switch 127, the assembled workpiece panel 113 has mainly a straight alignment on one side edge, even with strips 108 of different length—and, in the case of veneer strips cut to length, a uniform workpiece panel 113 is obtained.

The workpiece panel produced in this apparatus is mainly used as a plywood centre layer or plywood intermediate layer.

I claim:
1. Apparatus for the transverse assembling of strips, such as veneers, pasteboard strips or the like to form large sheets wherein individually fed strips are bound together in a continuous process on both sides alternately with adhesive-coated threads with reversal of the threads after passage of the read edge of each strip said threads being cemented by the application of heat and pressure, said apparatus comprising:
  (a) a device for the feeding of individual strips in a direction at right angles to the direction in which said adhesive-coated threads are applied to said strips;
  (b) a strip guide into which said feeding device feeds said strips, said strip guide being formed of upright guide walls extending in the direction in which said feeding device feeds said strips and a movable lower abutment normally located in a position to support said strips, but being adapted to be moved out of its supporting position;
  (c) bifurcated thread guides and thread weaving devices inserted between said upright guides;
  (d) means for cementing said adhesive-coated threads to said strips, said means being arranged below said thread guides and thread weaving devices;
  (e) means for removing the finished sheet;
  (f) means for pivotally suspending said thread guides and thread weaving devices; and
  (g) means for controlling the movement of said movable lower abutment and the downward discharge of the sheet, said control means comprising a pulse-generating switch actuated by laterally introduced strips.

2. Apparatus as claimed in claim 1, wherein said thread guides and thread wearing devices comprise a drive means reciprocated by a hydraulic cylinder and two guide members spaced from each other to form a gap open at the bottom for the passage of a strip, and provided with thread openings.

3. Apparatus as recited in claim 2, wherein adjacent thread guides and thread wearing devices each pivot in opposite directions.

4. Apparatus as recited in claim 2 wherein each thread guide and thread weaving device comprises a bifurcated head mounted to pivot in a cross head on a machine base and two guide members of channel section, the lower end of each being provided with a guide eyelet formed of a material having a low co-efficient of friction with respect to adhesive-coated thread and the upper end of each also being provided with a guide eyelet.

5. Apparatus as claimed in claim 1 wherein said guide walls are fastened to an apparatus base, said movable lower abutment comprises a hinged guide flap displaceable by means of a hydraulic cylinder, and said pulse-generating switch is located at the end of said strip guide.

6. Apparatus as recited in claim 1 and further comprising a braking device at one end of said strip guide, a photocell device adapted to be actuated by said strips and operatively connected to said braking device to retard the speed of said strip.

7. Apparatus as recited in claim 6 wherein said braking device comprises two brake rollers spaced from one another in positions where each can act simultaneously on opposite sides of a strip and means for displacing at least one of said rollers towards said strip for braking purposes.

8. Apparatus as recited in claim 7, wherein each brake roller has a friction (driving) surface, said friction surface being in engagement with a driving member, a pivoted bell crank lever on which said brake roller is mounted, and a hydraulic cylinder adapted to move said lever and said brake roller.

9. Apparatus as recited in claim 1, wherein said means for cementing comprise two electrically heated pressure shoes, hydraulic means for applying at least one of said pressure shoes intermittently to said sheets during the cementing process, and a lever mounted to pivot at a point in a bearing housing to which said intermittently presentable pressure shoe is connected.

10. Apparatus as recited in claim 9, wherein the working surfaces of said pressure shoes correspond to each other in shape and to an arcuate shape of a guiding wall which downwardly discharges assembled sheets of strips.

11. Apparatus as recited in claim 9, wherein said means for cementing comprise bearing housings which are displaceable in a direction at right angles to the direction in which said adhesive-coated threads are applied to said strips, but which are securable in position.

12. Apparatus as recited in claim 1 wherein said removing means comprises two rollers mounted on cross bars in an apparatus base, one of said rollers being driven while the other free-wheels, said free-wheeling roller being mounted on a lever adapted to pivot by means of a bearing axle on a bearing housing, a hydraulic cylinder acting on said level, and a set screw co-operating with a second abutment for determining the extent of movement of said free-wheeling roller.

13. Apparatus as recited in claim 12, wherein said lever supporting said free-wheeling conveyor roller is provided on a portion remote from its pivot with a set screw extending at an angle through said bearing housing and in contact with said bearing housing to provide a movement-limiting action.

14. Apparatus as recited in claim 12 comprising a plurality of said removing means and a common driving shaft for the driven rollers of all said removing devices.

15. Apparatus as recited in claim 1 wherein said removing means comprise a plurality of drives for removing said sheet, each of said drives being spaced from said guide walls and being adapted to be pressed against said sheets by means of a clamping device, and a common motor for said drives.

16. Apparatus as recited in claim 1 wherein said bifurcated thread guides and thread weaving devices each comprise guide forks which are interchangeable and each of which has a bifurcated head with a dove-tailed extension adapted to be mounted in a bearing member, a recess located in said bearing member, and screw means for securing said extension in said recess.

17. Apparatus as recited in claim 1 and further comprising a conveyor spider for the feeding of said strips and an automatic, hydraulically operated insertion member for said strips.

References Cited

UNITED STATES PATENTS

| | | | |
|---|---|---|---|
| 3,705,829 | 12/1972 | Brenneman et al. | 156—304 |
| 3,377,223 | 4/1968 | Clausen et al. | 156—166 |
| 3,490,974 | 1/1970 | Jacobson | 156—304 |
| 3,579,405 | 5/1971 | Crawford | 156—304 |
| 3,669,804 | 6/1972 | Clausen et al. | 156—304 |

DOUGLAS J. DRUMMOND, Primary Examiner

U.S. Cl. X.R.

156—433